US012049433B2

(12) United States Patent
Oxley et al.

(10) Patent No.: US 12,049,433 B2
(45) Date of Patent: Jul. 30, 2024

(54) PLASTICIZED FLEXIBLE PYROTECHNIC MATERIAL

(71) Applicant: University of Rhode Island Board of Trustees, Kingston, RI (US)

(72) Inventors: Jimmie Oxley, Narragansett, RI (US); James L. Smith, Narragansett, RI (US); Taylor Busby, Albuquerque, NM (US); Athina Kominia, Exeter, RI (US)

(73) Assignee: University of Rhode Island Board of Trustees, Kingston, RI (US)

( * ) Notice: Subject to any disclaimer, the term of this patent is extended or adjusted under 35 U.S.C. 154(b) by 436 days.

(21) Appl. No.: 17/203,325

(22) Filed: Mar. 16, 2021

(65) Prior Publication Data

US 2022/0017431 A1 Jan. 20, 2022

Related U.S. Application Data

(60) Provisional application No. 62/993,992, filed on Mar. 24, 2020.

(51) Int. Cl.
*C06B 45/10* (2006.01)
*A62D 3/38* (2007.01)

(52) U.S. Cl.
CPC ................ *C06B 45/10* (2013.01); *A62D 3/38* (2013.01)

(58) Field of Classification Search
CPC ................................. C06B 45/10; A62D 3/38
USPC ......................................................... 588/320
See application file for complete search history.

(56) References Cited

U.S. PATENT DOCUMENTS

| | | | |
|---|---|---|---|
| 5,458,706 A | 10/1995 | Finck et al. | |
| 5,565,150 A | 10/1996 | Dillehay et al. | |
| 6,896,751 B2 | 5/2005 | Posson et al. | |
| 8,361,258 B2 | 1/2013 | Ashcroft et al. | |
| 9,944,570 B1 | 4/2018 | Basom et al. | |
| 2018/0194699 A1* | 7/2018 | Spence | C06B 33/02 |
| 2018/0305270 A1 | 10/2018 | Lewtas | |
| 2019/0217383 A1 | 7/2019 | Sanderson et al. | |

FOREIGN PATENT DOCUMENTS

| | | |
|---|---|---|
| RU | 2278099 C1 * | 6/2006 |
| RU | 2661364 C1 * | 7/2018 |
| RU | 2717301 C1 * | 3/2020 |

OTHER PUBLICATIONS

Oxley, J.C., et al., "Polymer Packaging of I2 Producing Pyrotechnic Biocides", Journal of Energetic Materials, 36:4, 493-501, DOI: 1080/07370652.2018.1504140, https://tandfonline.com/doi/pdf/10.1080/07370652.2018.1504140?needAcess=true.

* cited by examiner

*Primary Examiner* — Edward M Johnson
(74) *Attorney, Agent, or Firm* — Hinckley Allen & Snyder; Stephen Holmes

(57) ABSTRACT

A plasticized pyrotechnic material can be easily portioned and formed or molded into a desired shape and burns at a high temperature (>2000° C.) but does not detonate. The plasticized pyrotechnic material may preferably include a combination of about 70-99% by weight of a pyrotechnic composition and about 1-30% by weight of a plasticizer composition comprising various low to mid molecular weight polyisobutylenes. The pyrotechnic material comprises inorganic oxidizers (e.g. metal oxides, oxohalide salts, nitrates, nitrites, chlorates/perchlorates) and metal or metal oxides powders mixed intimately. The plasticizer may include a small amount of a fluoropolymer, such as polytetrafluoroethylene (PTFE) and may also include up to 1-2% by weight of a processed oil, such as a mineral oil or motor oil. Some embodiments may also include a biocide precursor molecule.

12 Claims, 1 Drawing Sheet

PLASTICIZED FLEXIBLE PYROTECHNIC MATERIAL

CROSS-REFERENCE TO RELATED APPLICATIONS

Figure 1:
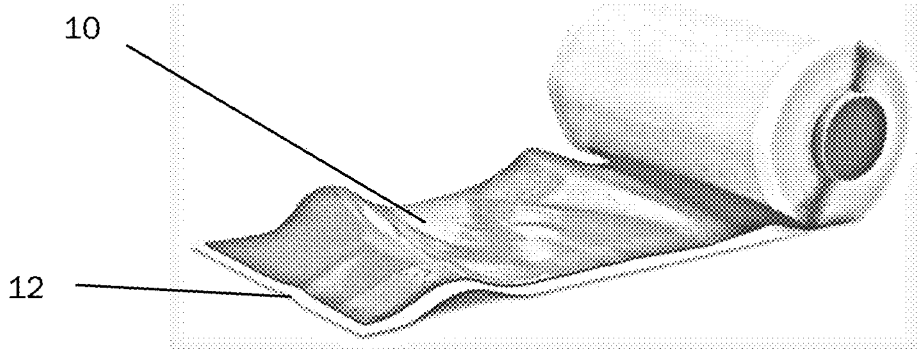

This non-provisional disclosure and application claims the benefit of U.S. Provisional Patent Application No. 62/993,992, Filed Mar. 24, 2020, the entire contents of which are incorporated herein by reference.

BACKGROUND OF THE DISCLOSURE

The present invention generally relates to disposal of hazardous materials and, more specifically, to pyrotechnic materials used for in-place destruction of hazardous materials.

Law enforcement and military personnel often encounter hazardous materials in the field that must be handled and/or disposed of in a safe manner. Many of these materials require immediate destruction in place without having to collect and transport them to a remote location for destruction. For example, these "destroy in place" materials could be unknown chemicals, unknown drug substances, known drugs, such as fentanyl, biological agents, chemical warfare agents (CWA), improvised explosive devices (IED), and other explosive materials, such as unexploded munitions (UXO).

When such a material is discovered in a public place and it is perceived to be a threat, it is the job of first responders to remove it or destroy it without further threat to themselves or to the public. In some cases, if the material is perceived to be of high sensitivity or an immediate threat, sometimes the decision is to burn the material in place. However, the options for burning in place are somewhat limited. At the present time, the best option for a burn-in-place disposal or destruction may be a thermite grenade, which is extremely effective at destroying virtually all threats. However, the burn area of the thermite material is limited to the grenade's outer diameter which generally limits its use to small areas of concentrated materials. With the thermite grenade's fixed size and shape, there is no ability to increase or decrease the active energetic material consumed and no way to scale the surface area covered.

With the recent increase in incidences of contact-hazard material threats, such as fentanyl, as well as other chemical and explosive hazards, there is an urgent need for new materials and methods of safe in-place destruction. Identification of the aforementioned hazardous materials may be difficult or impossible given minimal resources in the field. Therefore, it is critical to have a solution that is universally effective at destroying all of these hazardous materials.

SUMMARY OF THE INVENTION

The present disclosure describes a unique plasticized pyrotechnic material that can be easily portioned and then formed or molded into a desired shape directly at the hazardous threat location. The plasticized pyrotechnic material can be ignited with a conventional ignition source, such as an electric match or open flame. Once ignited, the pyrotechnic material burns at a high temperature (>2000° C.) effective to destroy the hazardous but does not detonate.

The plasticized pyrotechnic material comprises a combination of about 70-99% by weight of a pyrotechnic composition and about 1-30% by weight of a plasticizer composition comprising various low to mid molecular weight polyisobutylenes. The pyrotechnic material comprises inorganic oxidizers (e.g. metal oxides. oxohalide salts, nitrates, nitrites, chlorates/perchlorates) and metal or metal oxides powders mixed intimately. The plasticizer may also comprise a small amount of a fluoropolymer, such as polytetrafluoroethylene (PTFE). The material may also include up to 1-2% by weight of a process oil, such as a mineral oil or motor oil.

The pyrotechnic components are mixed together prior to introduction of the polymer mixture, which is introduced as a solution or slurry in a volatile organic solvent (such as hexane or petroleum ether) that is subsequently evaporated from the pyrotechnic material. Once evaporated, the final material may have a putty like texture similar to modeling clay.

The final product can be provided in the form of moldable blocks, flexible sheets, etc. in shape and volume. The pyrotechnic material contains a high amount of energetic material but when ignited it burns at a very high temperature rather than detonating.

A method of destroying hazardous materials in place comprises the steps of providing a plasticized pyrotechnic material in block or sheet form, portioning out a desired amount of the plasticized pyrotechnic from the sheet or block, molding or forming the portioned amount into a desired shape which covers the hazard, and igniting the material to destroy the hazard in place.

The material is highly stable, and safe. The present materials and methods can be safely, effectively and inexpensively deployed by bomb squads, hazmat teams, military, law enforcement officers and other first responders to destroy localized hazardous material threats of all shapes, forms and sizes, in place.

BRIEF DESCRIPTION OF THE DRAWING FIGURES

Figure 2:
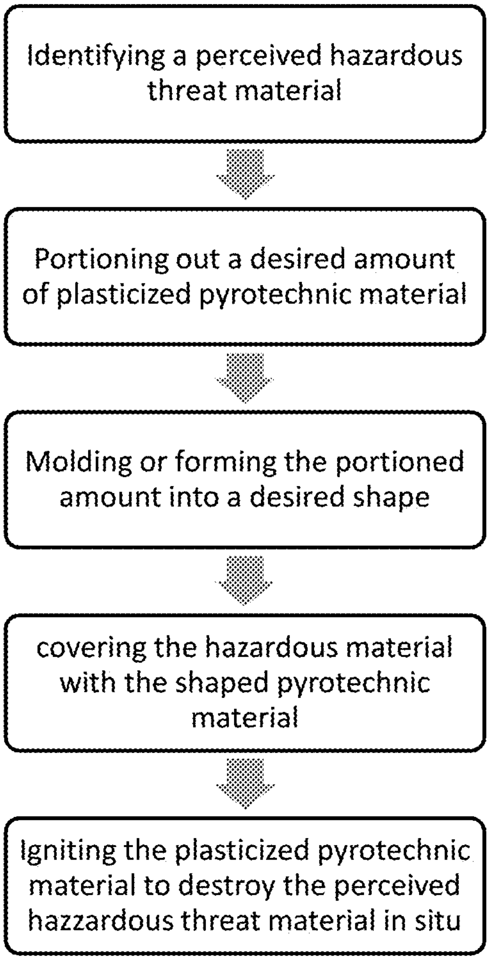

While the specification concludes with claims particularly pointing out and distinctly claiming particular embodiments of the present invention, various exemplary embodiments of the disclosure and invention can be more readily appreciated from the following descriptions of the various exemplary embodiments of the invention when read in conjunction with the accompanying drawings in which:

FIG. 1 is an illustration of an exemplary form of a plasticized pyrotechnic material made in accordance with the teachings of the present disclosure and provided in a sheet rolled form with a removable backing sheet; and FIG. 2 is a flow chart illustrating the steps of an exemplary method of identifying and destroying a hazardous threat material in place.

DETAILED DESCRIPTION OF THE INVENTION

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments.

Such modifications and variations are intended to be included within the scope of the present disclosure. Further, in the present disclosure, like-numbered components of the embodiments may generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

The present disclosure describes a unique plasticized pyrotechnic material which can be easily provided in a highly stable sheet or block form and then portioned and formed or molded into a desired shape at the hazardous material location. The plasticized pyrotechnic material can be ignited with a conventional ignition source, such as an electric match or open flame. Once ignited, the plasticized pyrotechnic material burns at a high temperature (>2000° C.) but does not detonate.

Referring to FIG. 1, a plasticized pyrotechnic material in accordance with the present invention, is generally indicated at 10, and may in some embodiments be provided in a rolled sheet form with a release sheet or insulator backing material 12, or may be provided in a simple block form (not shown) or other shaped forms.

The plasticized pyrotechnic material 10 may in some embodiments comprise a combination of about 70-99% by weight of a pyrotechnic composition and about 1-30% by weight of a plasticizer composition comprising various molecular weight (MW) polymers and in particular, polyisobutylenes. The percentages by weight can be varied and may in other embodiments, extend outside the ranges indicated to up 40 or 50% by weight of plasticizer with 50 to 60% by weight of pyrotechnic composition.

The pyrotechnic material composition 10 may comprise inorganic oxidizers, e.g. metal oxides, oxohalide salts, nitrates, nitrites, chlorates/perchlorates, and reactive metals or metal oxides powders, e.g. magnalium (Al/Mg) mixed intimately. Various exemplary formulations of the composition are possible (See Table 1) and may include iodate ($IO_3^-$) which releases the gaseous biocide $I_2$ when ignited.

The pyrotechnic composition 10 is desensitized by the addition of plastic elastomers making it highly stable and safe for storage, transport, and handling.

The plasticizer may comprise any plasticized polymer with number average molecular weight $M_n$ ranging from 500 to 1,300,00 in various combinations, and preferably with an $M_n$ ranging from about 16000 to about 550,000.

One exemplary plasticizer is polyisobutylene (PIB) with number average molecular weight $M_n$ ranging from 500 to 1,300,000 in various combinations. (see Table 1 below for exemplary materials and combinations which are not intended to be limiting).

The plasticizer may also comprise a small amount (0.5-2% by weight) of a fluoropolymer, such as polytetrafluoroethylene (PTFE). (See Table 1).

The material may still further include up to 1-2% by weight of a processed oil, such as a mineral oil or motor oil.

It should be noted that if the purpose of the burn is to destroy a bio-hazard/bio-organism, the formulation may in some embodiments comprise iodate ($IO_3^-$), which is a biocide precursor molecule which reacts and releases the biocide $I_2$ when ignited.

As set forth below in Table 1, there are various exemplary formulations disclosed which successfully function as described within the present disclosure. While the various formulations as listed identified are considered to be exemplary, these specific examples should not be considered limiting to the invention. One skilled in the art may derive additional exemplary materials from the teachings provided herein.

TABLE 1

Examples (small batch) of material formulations measured in grams(g)
The values identified below can be scaled proportionally for larger production batches

| $Ca(IO_3)_2$ (g) | $Fe(IO_3)_3$ (g) | $Fe_3O_4$ (g) | $KClO_4$ (g) | $KClO_3$ (g) | $NaNO_3$ (g) | $NaClO_3$ (g) | Al (g) | MgAl (g) | CuO (g) |
|---|---|---|---|---|---|---|---|---|---|
| 40 | | | | | | | 10 | | |
| 40 | | | | | | | | 10 | |
| | 40 | | | | | | 10 | | |
| 20 | | | | 20 | | | | 10 | |
| 36 | | | | 9 | | | | 5 | |
| 36 | | | | 9 | | | | 5 | |
| 9 | | | | 36 | | | | 5 | |
| | | 40 | | | | | | 10 | |
| | | 36 | | 4 | | | | 10 | |
| | | 12.5 | | 12.5 | | | 25 | | |
| | | | | 36 | | 4 | | 10 | |
| | | | | 36 | 4 | | | 10 | |
| | | | | 40 | | | | 10 | |
| | | | | 45 | | | | 5 | |
| | | | | 40 | | | | 10 | 1 |
| | | | | 45 | | | | 5 | |
| | | | | 45 | | | | 5 | |
| | | | | 45 | | | 5 | | 1 |
| | | | | 40 | | | | 10 | |
| | | | 40 | | | | | 10 | |
| | | | 30 | 10 | | | | 10 | 1 |
| | | | 36 | 4 | | | | 10 | |
| | | | 40 | | | | | 10 | 1 |

TABLE 1-continued

Examples (small batch) of material formulations measured in grams(g)
The values identified below can be scaled proportionally for larger production batches

| PIB (g) 2E6 | PIB (g) 6E5 | PIB (g) 1E5 | PIB (g) 7E4 | PIB (g) 5E4 | Fluoro 291 (g) | Fluoro 330 (g) | PTFE (g) | oil (g) |
|---|---|---|---|---|---|---|---|---|
| | | 40 | | | | | 10 | |
| | | 40 | | | | | 10 | |
| 0.61 | 0.85 | 1.69 | | | | | | |
| 0.61 | 0.85 | 1.69 | | | | | | |
| 0.61 | 0.85 | 1.69 | | | | | | |
| 0.61 | 0.85 | 1.69 | | | | | | |
| 0.61 | 0.85 | 1.69 | | | | | | |
| | | 1.6 | | 1.6 | | | | |
| 0.61 | 0.85 | 1.69 | | | | | | |
| 0.61 | 0.85 | 1.69 | | | | | | |
| 0.61 | 0.85 | 1.69 | | | | | | |
| 0.61 | 0.85 | 1.69 | | | | | | |
| 0.61 | 0.85 | 1.69 | | | | | | |
| 0.61 | 0.85 | 1.69 | | | | | | |
| 1.85 | 2.57 | 5.1 | | | | | | |
| 0.61 | 0.85 | 1.69 | | | | | | |
| 0.61 | 0.85 | 1.69 | | | | | 1 | |
| | | | 15.8 | | | | | |
| | | 4.76 | | 4.76 | | | | |
| 0.61 | 0.85 | 1.69 | | | | | 1 | |
| 0.61 | 0.85 | 1.69 | | | 0.5 | 0.5 | | |
| | | 7.9 | | 7.9 | | | | 0.8 |
| | | 7.9 | | 7.9 | 0.5 | 0.5 | | |
| | | 7.9 | | 7.9 | | | | |
| | | 7.9 | | 7.9 | 0.5 | 0.5 | | |
| | | 7.9 | 7.9 | | | | | |
| | | 15.8 | | | | | | |

In an exemplary method of preparation, the pyrotechnic components are mixed together prior to introduction of the polymer plasticizing mixture. The plasticizer is introduced into the mixed pyrotechnic composition as a solution or slurry in a volatile organic solvent (such as hexane or petroleum ether) that is subsequently evaporated from the pyrotechnic material (aqueous slurry-coating process). Evaporation can be accomplished in various manners, e.g. through ambient drying or drying with forced hot air. Once the solvent has evaporated, the final plasticized pyrotechnic material 10 may have a putty like texture similar to modeling clay.

The final plasticized pyrotechnic material 10 can be provided in the form of moldable blocks, flexible sheets, etc. in shape and volume. The pyrotechnic material contains a high amount of energetic material but when ignited it burns at a very high temperature rather than detonating.

An exemplary method of destroying hazardous materials in place is set forth in FIG. 2 and comprises the steps of providing a plasticized pyrotechnic material in accordance with the invention described herein, identifying a perceived hazardous threat, portioning out a desired amount of the plasticized pyrotechnic from a sheet or block, molding or forming the portioned amount into a desired shape which covers the hazard, and igniting the plasticized pyrotechnic material to destroy the hazard in place.

The plasticized pyrotechnic 10 contains a high volume of energetic material but when ignited it burns rather than detonates. The high heat release is generated by an interaction of the oxidizer with the metallic fuel. The polymers may also act as a fuel for the reaction.

The material is highly stable, and safe. The present materials and methods can be safely, effectively and inexpensively deployed by bomb squads, hazmat teams, military, law enforcement officers and other first responders to destroy localized hazardous material threats of all shapes, forms and sizes, in place. The material can be ignited using conventional flame sources such as an electric match or open flame which are already familiar to experienced first responders and hazardous disposal teams and readily available.

While there is shown and described herein certain specific structures representing various embodiments of the invention, it will be manifest to those skilled in the art that various modifications and rearrangements of the parts may be made without departing from the spirit and scope of the underlying inventive concept, and that the same is not limited to the particular forms herein shown and described except insofar as indicated by the scope of the appended claims

What is claimed:

1. A plasticized flexible pyrotechnic material for use in destroying hazardous materials, comprising a combination of:

50-99% by weight of a pyrotechnic composition comprising an inorganic oxidizer and metal or metal oxide powders;

1-50% by weight of a polymer plasticizer composition comprising one ore more low to mid molecular weight polyisobutylenes in the range of $M_n$ from 500 to 1,300,000; and an iodine based biocide precursor, wherein said plasticized, flexible pyrotechnic material has a putty-like texture and is easily portioned and formed or molded into a desired shape for application to a hazardous material, and which burns at a temperature greater than 2000 degree C. and releases gaseous $I_2$, for the destruction of hazardous bio-organisms, but does not detonate.

2. The pyrotechnic material of claim 1 wherein the plasticizer composition further comprises a fluoropolymer.

3. The pyrotechnic material of claim 1 further comprises about 1-2% by weight of a processed oil.

4. The pyrotechnic material of claim 2 further comprises about 1-2% by weight of a processed oil.

5. The pyrotechnic material of claim 1 comprising a combination of:

70-99% by weight of a pyrotechnic composition comprising an inorganic oxidizer and metal or metal oxide powders; and 1-30% by weight of a plasticizer composition.

6. The pyrotechnic material of claim 2 comprising a combination of:

70-99% by weight of a pyrotechnic composition comprising an inorganic oxidizer and metal or metal oxide powders; and 1-30% by weight of a plasticizer composition.

7. A method of destroying a hazardous material in situ comprising the steps of:

identifying a hazardous threat material at a location;

providing a sheet or block of a plasticized flexible pyrotechnic material comprising a combination of:

50-99% by weight of a pyrotechnic composition comprising an inorganic oxidizer and metal or metal oxide powders;

1-50% by weight of a polymer plasticizer composition comprising one ore more low to mid molecular weight polyisobutylenes in the range of $M_n$ from 500 to 1,300,000; and an iodine based biocide precursor, wherein said plasticized, flexible pyrotechnic material has a putty-like texture and is easily portioned and formed or molded into a desired shape for application to said hazardous threat material, and which burns at a temperature greater than 2000 degree C. and releases gaseous $I_2$, for the destruction of hazardous bio-organisms, but does not detonate;

selecting an appropriately sized portion of the plasticized flexible pyrotechnic material from the sheet or block;

forming the portioned pyrotechnic material into a predetermined shape to cover the hazardous material in situ;

igniting the portioned pyrotechnic material to destroy the hazardous material without detonation.

8. The method of claim 7 wherein the plasticizer composition further comprises a fluoropolymer.

9. The method of claim 7 wherein the pyrotechnic material further comprises about 1-2% by weight of a processed oil.

10. The method of claim 8 wherein the pyrotechnic material further comprises about 1-2% by weight of a processed oil.

11. The method of claim 7 wherein the pyrotechnic material comprises a combination of:

70-99% by weight of a pyrotechnic composition comprising an inorganic oxidizer and metal or metal oxide powders; and 1-30% by weight of a plasticizer composition.

12. The method of claim 8 wherein the pyrotechnic material comprises a combination of:

70-99% by weight of a pyrotechnic composition comprising an inorganic oxidizer and metal or metal oxide powders; and 1-30% by weight of a plasticizer composition.

* * * * *